United States Patent [19]

Walle

[11] 4,014,429

[45] Mar. 29, 1977

[54] PARTS FEEDER AND ORIENTER WITH INDUCTION RING FEED NOZZLE

[75] Inventor: Irwin Walle, Clearwater, Fla.

[73] Assignee: Tangen Drives, Inc., Clearwater, Fla.

[22] Filed: Nov. 17, 1975

[21] Appl. No.: 632,234

[52] U.S. Cl. .............................. 198/396; 198/392; 198/453; 302/2 R

[51] Int. Cl.² .............................. B65G 47/14

[58] Field of Search .......... 198/287, 278, 288, 396, 198/392, 453; 302/2 R, 24, 13, 1; 221/278

[56] References Cited

UNITED STATES PATENTS

| | | | |
|---|---|---|---|
| 3,086,822 | 4/1963 | Fibish | 198/287 X |
| 3,649,081 | 3/1972 | Johnson | 302/2 R |
| 3,868,148 | 2/1975 | Schultz | 302/2 R |
| 3,908,860 | 9/1975 | Schultz | 198/278 X |

*Primary Examiner*—Evon C. Blunk
*Assistant Examiner*—Douglas D. Watts
*Attorney, Agent, or Firm*—Jack E. Dominik

[57] ABSTRACT

A parts feeder is shown illustrated with a rotary type feeder having circular side walls in which the parts are picked up by a feed nozzle on the periphery of the side walls, and delivered to an induction ring assembly in which jets pneumatically transfer the parts into a feed tube which elevates the parts and delivers the same to a dispenser, the latter serving to drop the same onto counter rotating rollers for orientation. The counter rotating rollers are positioned over the rotary feeder so that parts not accepted by the same are dropped into the feeder for recirculation. The steps of the method include delivering parts in a path having feed pressure and unoriented, transferring the parts to an induction ring with means for reversing the parts pneumatically, applying a pulsating cycle to the induction ring so that the parts proceed forwardly and intermittently in a reverse fashion to reduce jamming tendencies, confining the parts after they have passed the induction ring to transfer to a remote location, and thereafter transferring the parts from the confining means to orientation means for delivering the oriented parts.

6 Claims, 8 Drawing Figures

32 30 34 10 42 70 25 36 41 76 40 35 22 75 84 38 39 19 21 26 28 85 14 12 11 29

PARTS FEEDER AND ORIENTER WITH INDUCTION RING FEED NOZZLE

BACKGROUND

1. Field Of Invention

The present invention relates to small parts feeders of the type generally found in Patent Office class 198, sub-class 276 as well as sub-classes 255,273,276, 281, 288, 289, and class 221 sub-classes 159 and 160, and elsewhere in the art. The basic field includes vibratory parts feeders, rotary parts feeders, conveyors, and linear type parts feeders all having the ultimate goal of delivering unoriented parts in an oriented fashion for further processing, usually in a manufacturing or assembly operation.

2. Description Of The Prior Art

U.S. Pat. No. 3,881,596 is exemplary of the prior art. It will be seen there that a rotary feeder is employed to transfer a plurality of cups such as might be employed as overcaps on aerosol packaged products. Patent 3,881,596, assigned to applicants assignee, shows a machine which work very efficiently and effectively, but is the result of special purpose tooling for various parts which are to be fed. Other U.S. patents exemplary of the prior art are Nos. 3,828,921 and 3,860,145. Invariably, however, the devices and methods illustrative of the prior art require some special tooling. A need still exists, unfulfilled, to develop a parts feeder and method which has a wide variety of adjustable features, and upon which a whole host of parts can be the subject of experimental feeding, and thereafter by adjustment, feed the parts at efficient rates. Such a machine and method offers the advantage to the manufacturer of not gambling on the man hours devoted to special purpose tooling, and the purchaser has the advantage of flexibility in that the same machine may be used for running different parts provided it is adjusted between the runs.

SUMMARY

The present invention stems from the discovery of a parts feeder having delivery means for directing parts in random fashion to a pick up point with pressure feed, and the pick up point having means for directing the parts to an induction ring, the induction ring having in turn pneumatic means for accelerating and decelerating the parts to thereby reduce jamming, delivering the parts to a confining means for transferring the same to a location spaced to the induction ring, and thereafter transferring the parts to orientation means for delivering the parts in an oriented fashion. The method is directed to the steps of delivering parts in a path with feed pressure, transferring the delivered parts to an induction ring assembly for accelerating and decelerating the parts, applying a pulsating cycle to the induction ring so that the parts proceed forwardly and in a reverse fashion intermittently, confining the parts after passing the induction ring for transfer, and then transferring the parts to means for orienting the same. In a specific embodiment and method, a rotary feeder is employed, with the induction ring having a feed nozzle convergingly delivering parts thereto. A tube confines the parts and takes them upwardly and over the rotary feeder dropping them onto counter rotating rollers which orient the parts and deliver the same for further processing.

In view of the foregoing it is a principle object of the present invention to provide a method and parts feeder which is widely adaptable for feeding numerous types of small parts.

Still another object of the present invention is to provide a parts feeder with pneumatic means for reducing jamming tendencies to an irreducible minimum, and thereafter delivering the parts in high speed fashion.

Still another advantage of the present advantage stems from the feeding of parts in a unit which is widely adjustable as to feed rate, reverse cyclying, as well as orientation spacing to the end that both the manufacturer of the feeder as well as the user can adapt the same for a whole host of parts without special purpose tooling.

Still another object of the present invention is to achieve the foregoing advantages in a unit which is within the economic parameters of parts feeders in general, and directly competitive therewith.

Yet another and more detailed object of the present invention is to provide a parts feeder and method with a self-induced jamming effect to the end that the means for terminating the jamming action are at the jamming point, and consequently the parts fed thereafter will be spaced each from the other to a point where jamming tendencies are minimized.

DESCRIPTION OF ILLUSTRATIVE DRAWINGS

Further objects and advantages of the present invention become apparent as the following description of an illustrative embodiment proceeds taken in conjunction with the accompanying drawings in which.

DESCRIPTION OF PREFERRED EMBODIMENT

Figure 1:
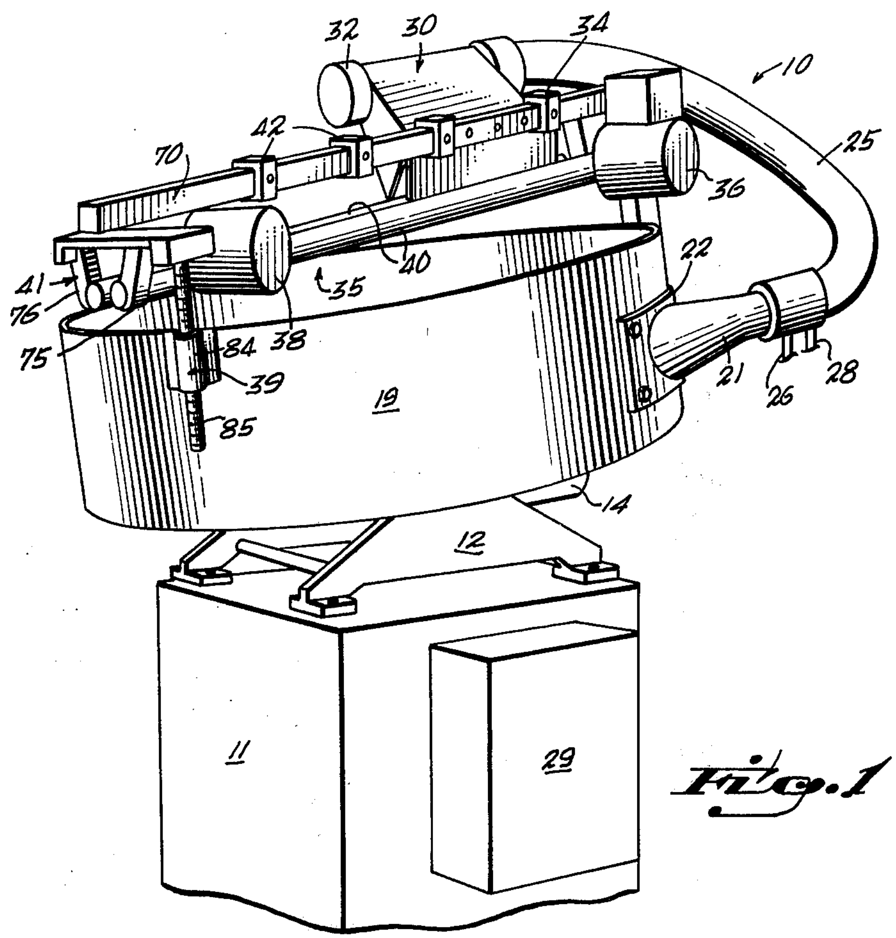
FIG. 1 is a perspective partially broken view of a feeder illustrative of the present invention.

The method and apparatus of the present invention is directed to a parts feeder as generally as shown in FIG. 1, and will be best understood after a description of one physical embodiment is set forth. As will be seen in FIG. 1, the parts feeder 10 is mounted atop a stand 11, having at the upper portion of the stand an adjustable support 12. Because the parts feeder 10 is of the rotary cone type, the adjustable support 12 provides for increasing or decreasing feed pressures at the periphery. Interioraly of the hopper 19 is a rotor 15 (see FIG. 2)

which has a peripheral scuff ring 16 and a center ring 18, the same being driven by a rotor motor 14. The general organization of the rotary feeder is similar to applicants assignees U.S. Pat. No. 3,881,596, and others. The same are sold to the trade under the trademark Centrifeed Rotary Feeders.

Figure 2:
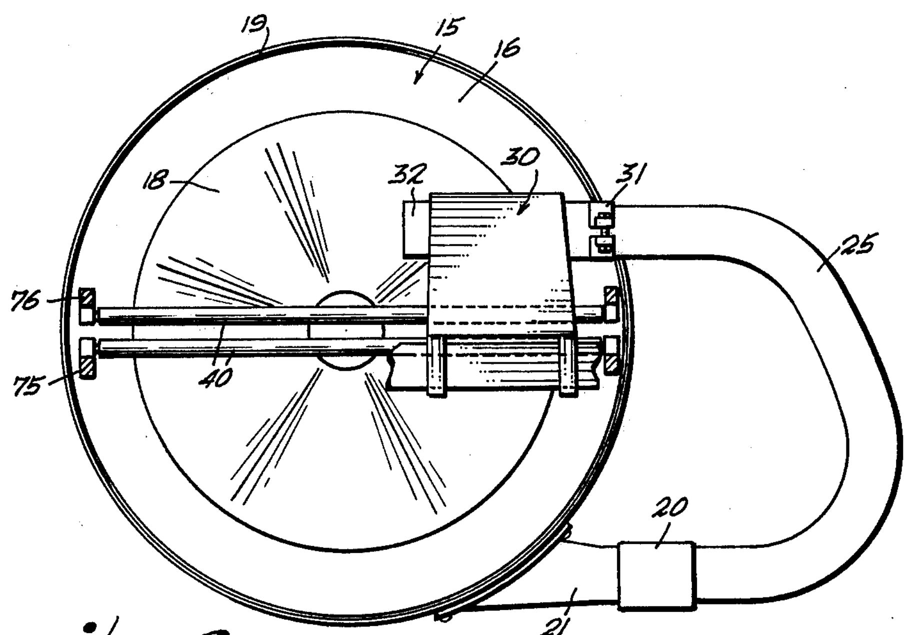
FIG. 2 is a top view of the feeder show in FIG. 1 in essentially the same scale as that shown in FIG. 1.

As will be observed in both FIG. 1 and 2, an induction ring assembly 20 is provided which is fed by a feed nozzle 21, the same being secured by the feed nozzle mount 22 to the hopper 19.

Figure 3:
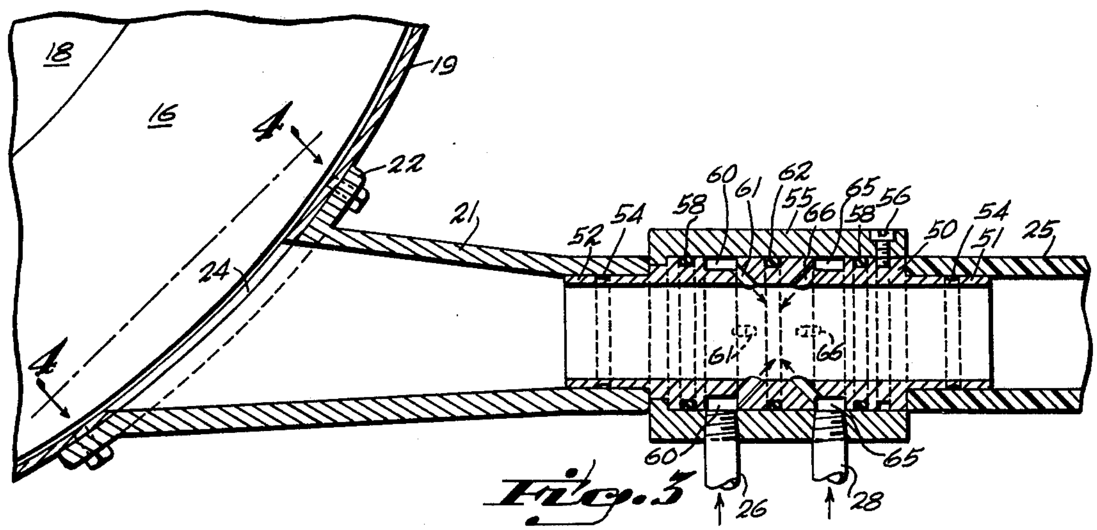
FIG. 3 is a horizontal sectional view taken generally along section lines 3—3 of FIG. 2 but in significantly larger scale than in FIG. 2.
Figure 4:
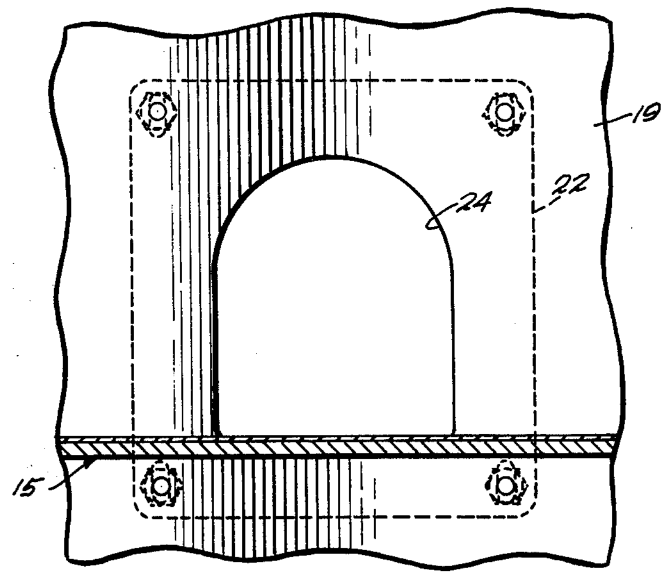
FIG. 4 is a further partially transverse sectional view taken along section line 4—4 of FIG. 4 in enlarged scale.

Turning now to FIG. 3, it will be seen that the feed nozzle 21 has a feed nozzle throat 24 which is an opening (as shown in FIG. 4) in the hopper 19 of the rotary feeder and rotor 15. The induction ring assembly 20 is, in turn, coupled to a feed tube 25 which, as illustrated particularly in FIG. 1, elevates the parts that are pneumatically urged therethrough by the induction ring assembly 20 upwardly and into a dispenser 30. The means for transferring the parts, include drive air 26 and reverse air 29, all fed through supply tubes as identified by reference numerals 26, 28 in FIG. 1 and 3. Control box 29 programs the pulsing of the air to the end that the parts may be accelerated upwardly into the feed tube 25, or reversed back into the feed nozzle 21 to unclog any jamming that may occur.

The dispenser 30, as shown particularly in FIG. 4, is coupled by a feed tube connector 31 to the feed tube 25. The feed tube connector 31 is shown in phantom lines in FIG. 4. In addition, a rebound plate 32 (see FIG. 1) may be positioned opposite feed tube connector 31 for those parts which require cushioning after their high speed feed into the interior portion of the dispenser 30. The dispenser 30 is secured by means of a dispenser mount 34 to the mounting beam 70 which is also employed to assist in mounting the counter rotating roller assembly 35.

Figure 6:
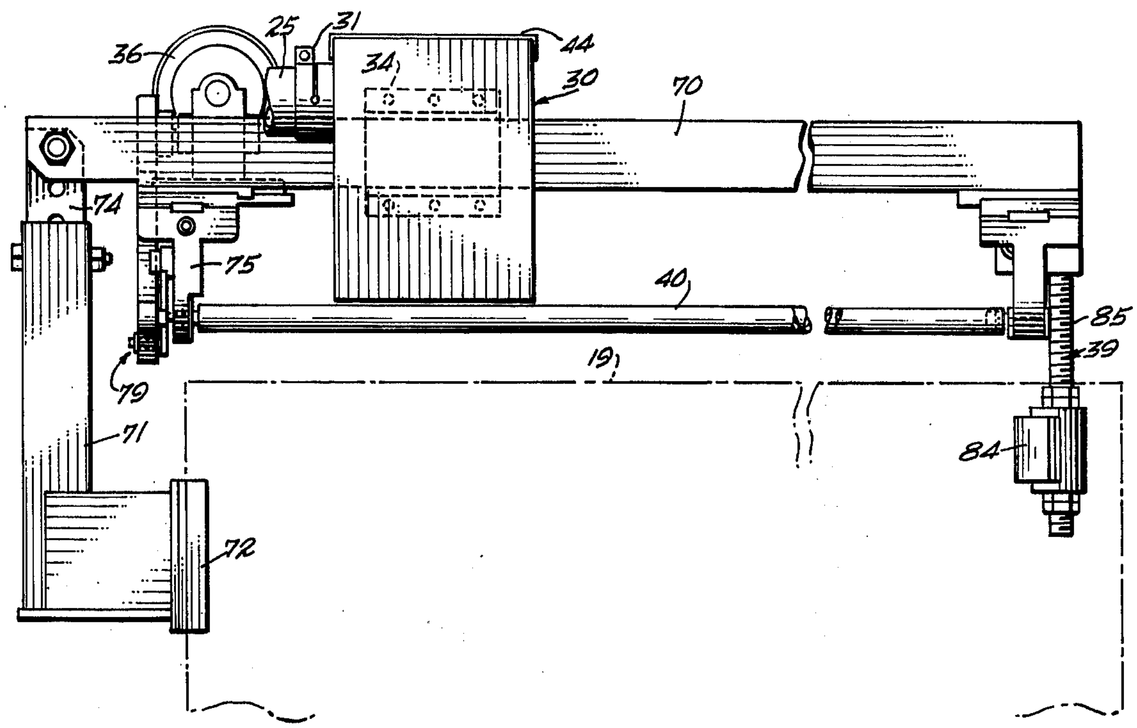
FIG. 6 is a front elevation of the counter rotating rollers showing in phantom lines how the same is geared to the rotary feeder and the peripheral hopper portions thereof.

Turning now to FIG. 6, it will be seen that the roller assembly 35 contemplates a roller drive motor 36, and a brush motor 38, the latter serving to accelerate parts at the downward portion of the counter rotating rollers 40 as illustrated in FIG. 1. A discharge adjuster 39 is provided at the discharge end of the counter rotating roller assembly 35, and as pointed out above, parallel rolls 40 are counter rotatingly driven. A roll adjustment 41 is also provided at the end opposite the discharge adjustment 39. Clamps 42 for both jets and wipers are optionally provided along the mounting beam 70 described above in connection with its function to mount the counter rotating roller 40 as well as the dispenser 30.

Figure 5:
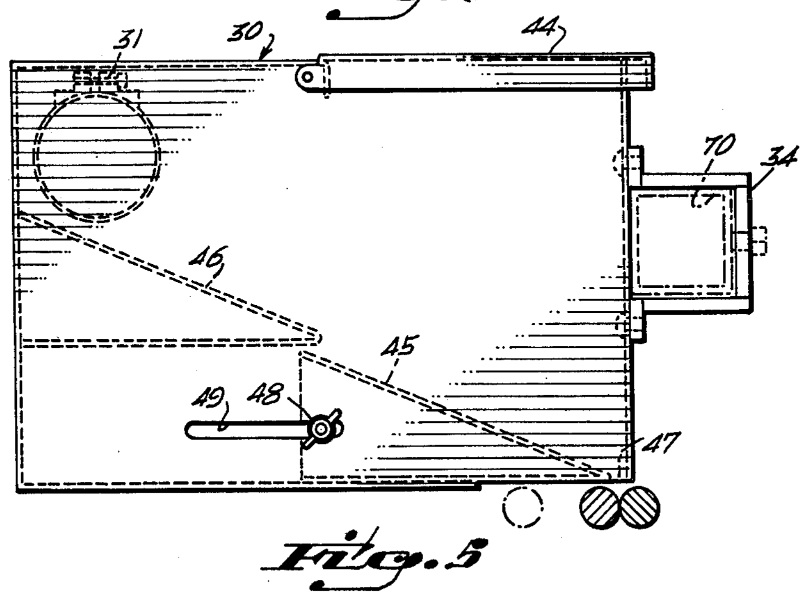
FIG. 5 is an end view of the dispenser shown in perspective in FIG. 1 and in plan view in FIG. 2, taken from the end portion thereof and illustrating some interior elements in phantom lines.

The dispenser 30, again referring to FIG. 5, is provided with an inspection lid 44 to permit adjustment of the same by visual inspection of its interior. A false bottom 45 having a triangular cross section is mounted in adjustable relationship with the angled fixed bottom 46, by means of a slot 49 and wing nut 48 which, upon adjustment, vary the width of the discharge slot 47 which is immediately above the counter rotating rollers 40. Therefore the width of the slot 47 can be adjusted, and at the same time the spacing between the counter rotating rollers 40 can be adjusted, to coordinate the spaced relationship between the two as well as the part to be fed, all empirically adjustable with a wide variety of parts which may be tuned for use in the subject feeder employing the method involved.

Referring back to FIG. 3, the induction ring assembly 20 will be observed to include the inner induction ring 50 having a feed tube connector 51 at one end, and a feed nozzle connector 52 at the other end. Connector O rings 54 are provided adjacent both connectors to pneumatically seal the interior induction ring to its respective feed nozzle 21 and feed tube 25. A drive air manifold 60 is peripherally cut into the outer portion of the inner induction ring 50, and is downstream of the reverse air manifold 65, similarly cut in the periphery of the induction ring 50. The drive air jets 61 are directed at an approximate 45 degree angle inwardly and upstream from the upstream portion of the drive air manifold 60, and conversely, the reverse air jets 66 are at an angle of about 45° and upstream of the drive air jets and directed rearwardly. It is preferred that the jets are directed centrally and longitudinally of the induction ring 50, although in certain applications they may be angled to direct jets tangentially interior of the induction ring 50 to provide a cyclonic flow of the parts as the same pass through the induction ring assembly 20. In operation, the preferred pressure is approximately 30lbs. per square inch, but this can be determined empirically. The pressure differential employed favors an excess on the reverse jets 66 to the drive air jets 61. The reason is that the reverse pressure must be strong enough to dislodge locked parts, and yet the reverse pressure can be adjusted or tuned to the minimum to accomplish the job. In some instances the weight of the parts will be such that the reverse jets 66 are not activated, since stopping the pressure of the drive jets 61 will cause the parts to tumble and automatically dislodge the jamming effect either in the induction ring assembly 20 or in the feed nozzle 21.

While an induction ring assembly 20 has been shown and described in detail, it will be appreciated that a ring jet which transmits a curtain of air can also be employed instead of the induction ring. The ring jets normally will transmit a 360° conical curtain of air in one direction or the other. The ring jets are more efficient in that for a total amount of air moved, including make-up air and the air transmitted through the ring jet, there is a lower compressed air consumption. Furthermore, with certain types of parts, the thrust is greater, as well as the reverse action to break up any clogs or jams.

Some clean parts may be run steadily with a one second stop. As mentioned above depending on weight, some parts may free themselves of jamming on gravity alone. Otherwise, when the reverse jet 66 is activated the blast of air normally is one second or less. The objective of the feed nozzle 21, which has a tapered funnel like effect, is to induce any jamming which may occur at the induction ring assembly 20, so that the latter is equipped to unlock the jam before the parts are delivered to the feed tube 25. After passing into the feed tube 25, experience has shown that most of the parts pass in single file spaced relationship directly into the dispenser 30. Such parts as have been successfully fed with the subject device are hypodermic syringe plungers, hypodermic syringe barrels, and bottle caps, and a whole host of parts having either ears in opposed relationship, or frusto-conical sections to the end that they are ultimately oriented on counter rotating rollers.

Figure 7:
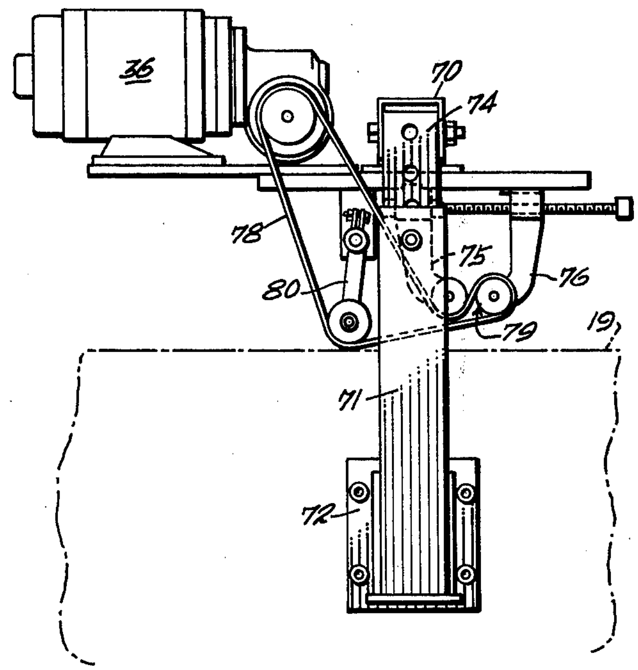
FIG. 7 is an end view of the roller assembly shown in FIG. 6 taken from the left end portion thereof.
Figure 8:
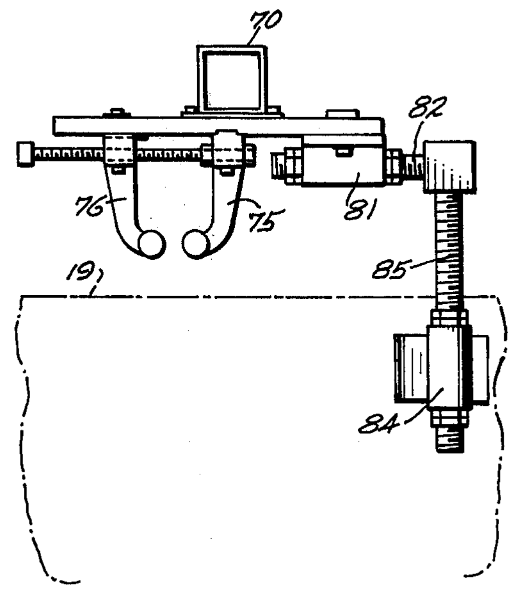
FIG. 8 is another end view of the roller assembly shown in FIG. 6 taken from the right end portion thereof.

Mention was made of the mounting beam 70 and the end support 71 (see FIG. 6) which secure the roller assembly 35 as well as dispenser 30 in operative relationship to the hopper 19. The same is mounted to the hopper bracket 72, and is adjustable upwardly and downwardly by means of the adjustable post 74 as shown in the left hand portion of FIG. 6. At the opposite side of the roller assembly 35 there is a discharge adjuster 39 (see FIG. 8) which threadedly engages the hopper support 84 and by means of the hopper support thread 83 adjustably raises and lowers the discharge end portion of the counter rotating rollers 35. The rollers are driven by means of a belt 78 and pulley assembly 79 adjusted by the idler 80 as shown generally in FIG. 7. The spacing between the counter rotating roller 40 is, at the discharge end, adjusted by means of the fixed roller arm 75 and the adjustable roller arm 76, the same being threadedly adjustable toward or away from each other. At the opposite end or the feed end, as shown in FIG. 7 by the same reference numerals, a fixed roller arm 75 and adjustable roller arm 76 are also provided. Furthermore, from a standpoint of linearity, it will be seen that the discharge end of the counter rotating roller assembly 35 (see FIG. 8) is provided with an adjustment sleeve 81 and adjustment shaft 82 so that the same can move the roller bracket 75, 76 laterally, along with the end of the mounting beam 70 to accomplish a further adjustment in the structure.

It will be appreciated that while a counter rotating roller has been disclosed, the same could also be substituted by a vibratory feeder, elevator, linear track, or hopper to deliver the parts to the feed nozzle 21 and fenced to the induction ring assembly 20 for further processing in accordance with the structural confinement as just described.

THE METHOD

The method of feeding parts, contemplated by the present invention comprise of the following steps:

a. Delivering parts in a path having feed pressure but no specific orientation, that is, being presented in random positioning, b. transferring the thus delivered parts to an induction ring assembly with means for accelerating the parts and means for reversing the parts pneumatically, c. applying a pulsating cycle to the induction ring so that the parts proceed forwardly and in a reverse fashion intermittently to reduce a tendency to jam, the reverse cycle being a function of either reverse air pressure, preferably greater than the forward driving pressure, or gravity due to a pause in the activation of the drive air, d. after the parts pass through the induction ring confining the same for transfer to a location spaced relationship thereto, preferably above the feed means which originally deliver the parts to the end that discharged parts will be recirculated, e. and thereafter transferring the parts from the confining means to orienting means, such as counter rotating rollers, tracks, and the like, for thereafter delivering the unoriented parts in an oriented fashion for further processing.

In connection with the above method, the pneumatic pressure applied is desirably 30 lbs. with a pressure differential between the drive air and the reverse air favoring the reverse air. Control means are provided for cyclying, normally once every 30 seconds to one minute, and a reverse blast of approximately one second, or a dwell from one to five seconds where the weight of the parts will accomplish the reversal to reduce the jamming. These various elements are determined empirically due to the adjustable features on the feeder and in the use of the method, to the end that a wide variety of parts can be fed in accordance with the subject method by experimentation with the variable.

Although particular embodiments of the invention have been shown and described in full here, there is no intention to thereby limit the intention to the details of such embodiments. On the contrary, the intention is to cover all modifications, alternatives, embodiments, usages, and methods and equivalents of a feeder and method of feeding as fall within the spirit and scope of the invention, specification, and the appended claims.

What is claimed is:

1. A parts feeder comprising, in combination:

delivery means for delivering parts in random fashion and unoriented with feed pressure to a pick up point, means to said pick up point for directing said parts into an induction ring, an induction ring having pneumatic means for accelerating and decelerating said parts in predetermined timed relationship to the passage therethrough, said induction ring having a plurality of jets, one area of said jets being directed forwardly for transport of the parts, reverse jets being directed rearwardly for the unjamming of parts, said jets being in spaced relationship to each other with the reverse jet being upstream of the flow, and the moving jet being downstream of the flow, means for confining said parts and transferring the same to a location in spaced relationship with the induction ring, means for transferring the parts from the confining means to orientation means for thereafter delivering the unoriented transported parts in oriented fashion for further processing.

2. A parts feeder comprising, in combination:

delivery means for delivering parts in random fashion and unoriented with feed pressure to a pick up point, means at said pick up point for directing said parts into an induction ring, an induction ring having pneumatic means for accelerating and decelerating said parts in predetermined timed relationship to the passage therethrough, means for confining said parts and transferring the same to a location in spaced relationship with the induction ring, means for transferring the parts from the confining means to orientation means for thereafter delivering the unoriented transported parts in oriented fashion for further processing, said orientation means comprising a pair of opposed counter-rotating rollers, said opposed counter-rotating rollers being positioned above the original feed means for discharging unoriented or lost parts in the said feeding means for recirculation.

3. A parts feeder comprising, in combination:

delivery means for delivering parts in random fashion and unoriented with feed pressure to a pick up point, means at said pick up point for directing said parts into an induction ring, said pick up means having converging side wall portions in the upstream direction, an induction ring having pneumatic means for accelerating and decelerating said parts in predetermined timed relationship to the passage therethrough, means for confining said parts and transferring the same to a location in spaced relationship with the induction ring, means for transferring the parts from the confining means to orientation means for thereafter delivering the unoriented transported parts in oriented fashion for further processing, whereby jamming of the parts, if any, is induced prior to transport of the same into the induction ring.

4. A parts feeder comprising in combination:

delivery means for delivering parts in random fashion and unoriented with feed pressure to a pick up point, means at said pick up point for directing said parts into an induction ring, said means for delivering the parts comprising a rotary type feeder having sidewalls, said pick up means being positioned in the side wall portion of said feeder, an induction ring having pneumatic means for accelerating and decelerating said parts in predetermined timed relationship to the passage therethrough, said induction ring having a plurality of jets, one area of said jets being directed forwardly for transport of the parts, reverse jets being directed rearwardly for the unjamming of parts, said jets being in spaced relationship to each other with the reverse jet being upstream of the flow, and the moving jet being downstream of the flow, means for confining said parts and transferring the same to a location in spaced relationship with the induction ring, means for transferring the parts from the confining means to orientation means for thereafter delivering the unoriented transported parts in oriented fashion for further processing.

5. A parts feeder comprising, in combination:

a delivery means for delivering parts in random fashion and unoriented with feed pressure to a pick up point, said means for delivering the parts comprising a rotary type feeder having sidewalls, said pick up means being positioned in the side wall portion of said feeder, means at said pick up point for directing said parts into an induction ring, an induction ring having pneumatic means for accelerating and decelerating said parts in predetermined timed relationship to the passage therethrough, means for confining said parts and transferring the same to a location in spaced relationship with the induction ring, said confining means comprising a tubular member coupled to the induction ring, a dispenser receiving the parts delivered from said confining means, said dispenser being oriented above the final orienting means for charging the parts thereto, means for transferring the parts from the confining means to orientation means for thereafter delivering the unoriented transported parts in oriented fashion for further processing, said orientation means comprising a pair of opposed counter-rotating rollers, said opposed counter-rotating rollers being positioned above the original feed means for discharging unoriented or lost parts in the said feeding means for recirculation.

6. In the feeder of claim 5:

said pick up means having converging side wall portions in the upstream direction, whereby jamming of the parts, if any, is induced prior to transport of the same into the induction ring.

* * * * *